United States Patent
Makino et al.

(10) Patent No.: US 6,859,816 B2
(45) Date of Patent: Feb. 22, 2005

(54) FAST FOURIER TRANSFORM METHOD AND INVERSE FAST FOURIER TRANSFORM METHOD

(75) Inventors: Kenichi Makino, Tokyo (JP); Jun Matsumoto, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 09/770,963

(22) Filed: Jan. 25, 2001

(65) Prior Publication Data

US 2002/0035588 A1 Mar. 21, 2002

(30) Foreign Application Priority Data

Jul. 31, 2000 (JP) .......................................... 2000-232469

(51) Int. Cl.[7] .............................................. G06F 17/14
(52) U.S. Cl. ....................................................... 708/404
(58) Field of Search ................................. 708/404, 405

(56) References Cited

U.S. PATENT DOCUMENTS

| 4,245,325 A | * | 1/1981 | Kikuchi et al. .............. 708/311 |
| 6,115,728 A | * | 9/2000 | Nakai et al. ................. 708/404 |
| 6,230,176 B1 | * | 5/2001 | Mizutani ..................... 708/404 |
| 6,247,034 B1 | * | 6/2001 | Nakai et al. ................. 708/409 |

* cited by examiner

Primary Examiner—David H. Malzahn
(74) Attorney, Agent, or Firm—Jay H. Maioli

(57) ABSTRACT

First, at step S1, i=0 is set. At step S2, data comprising M samples is fetched. At step S3, an M-point DFT is applied to the data fetched at step S2 above. At step S4, an obtained y(k) is multiplied by a twist coefficient w(i, k). The result is placed in y(k). At step S5, the value in y(k) is overwritten to an array x which contains original data. The above processing is repeated N/M times through steps S6 and S7 until all the input data is processed. At step S9, an FFT with N/M (=$2^n$) points is performed within the range of $0 \leq k < M$. Finally, at step S12, a sort is performed.

10 Claims, 4 Drawing Sheets

FAST FOURIER TRANSFORM METHOD AND INVERSE FAST FOURIER TRANSFORM METHOD

BACKGROUND OF THE INVENTION

1. Technical Field

The present invention relates to a fast Fourier transform method and an inverse fast Fourier transform method which conventionally use $2^n$ (2 to the nth power) points and are incapable of an FFT using other specified number of points.

2. Prior Art

A conventional fast Fourier transform (FFT) has a restriction that the number of points N must be $N=2^n$. Otherwise, it has been impossible to perform a fast operation of discrete Fourier transform (DFT) by using an existing apparatus.

BRIEF SUMMARY OF THE INVENTION

Conventionally, a fast Fourier transform method and an inverse fast Fourier transform method are incapable of FFT and IFFT using $N=M\times 2^n$ (M is an odd number) for input data. It is therefore an object of the present invention to provide a fast Fourier transform method and an inverse fast Fourier transform method of enabling such FFT and IFFT.

For solving the above problem, a fast Fourier transform method according to the present invention is characterized by inputting complex number data of $M\times 2^n$ points in which M is an odd number and n is an integer, applying a fast Fourier transform to this input data, and outputting complex number data of $M\times 2^n$ points.

This fast Fourier transform method applies specified processing to the input data, performs a $2^n$-point fast Fourier transform in a region which is split into M portions, and outputs a result of $M\times 2^n$-point discrete Fourier transform.

In the fast Fourier transform method, the specified preprocessing first splits the input data, performs an M-point discrete Fourier transform for the split data, and then performs a multiply operation of the obtained M-point discrete Fourier transform coefficient.

The fast Fourier transform method uses trigonometric function's symmetry to decrease an operation amount when finding a discrete Fourier transform coefficient by applying an M-point discrete Fourier transform to the split data.

For solving the above problem, an inverse fast Fourier transform method according to the present invention inputs complex number data of $M\times 2^n$ points in which M is an odd number and n is an integer, applies an inverse fast Fourier transform to this input data, and outputs the complex number data of $M\times 2^n$ points.

The inverse fast Fourier transform method applies specified preprocessing to the input data, applies a $2^n$-point inverse fast Fourier transform in a region which is split into M portions, and outputs a result of an $M\times 2^n$-point inverse discrete Fourier transform.

In the inverse fast Fourier transform method, the specified preprocessing first splits the input data, performs an M-point inverse discrete Fourier transform for split data, and then performs a multiply operation of the obtained M-point inverse discrete Fourier transform coefficient.

In the inverse fast Fourier transform method, the specified preprocessing uses trigonometric function's symmetry to decrease an operation amount when finding an inverse discrete Fourier transform coefficient by applying an M-point inverse discrete Fourier transform to the split data.

It becomes possible to provide an FFT with $N=M\times 2^n$ (M is an odd number) points which has been infeasible on a conventional apparatus. When a fast FFT apparatus is available, using this apparatus minimizes a development cost compared creating a new apparatus.

DETAILED DESCRIPTION OF THE INVENTION

Figure 1:
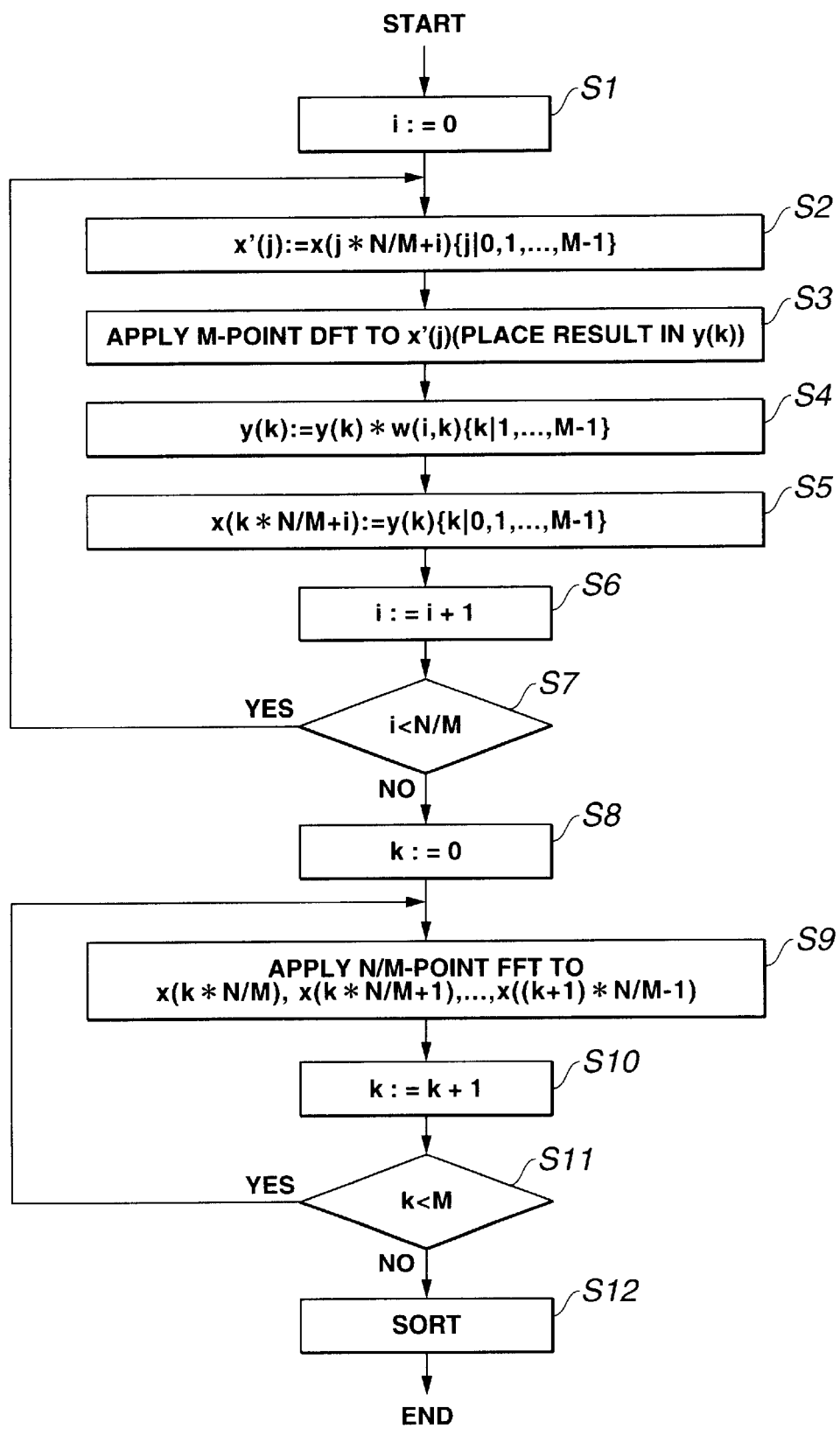
FIG. 1 is a flowchart for implementing an FFT with $N=M\times 2^n$ points (M is an odd number)

First of all, the following describes the FFT principle requisite for the fast Fourier transform method and the inverse fast Fourier transform method according to the present invention.

The discrete Fourier transform (DFT) is used for finding a Fourier coefficient X(k) from given N data samples x(0), x(1), . . . , x(N−1) as shown in the following equation (1):

[Formula 1]

$$X(k) = \sum_{n=0}^{N-1} x(n)\exp\left(-j\frac{2\pi nk}{N}\right) k = 0, \ldots, N-1 \qquad (1)$$

When this DFT permits factorizing the total number of data samples N into $N=N_1N_2$, it is possible to express n and k as in the following equations:

[Formula 2]

$$\begin{cases} n = \dfrac{N}{N_1}n_1 + \dfrac{N}{N_1N_2}n_2 = N_2n_1 + n_2 \\ k = \dfrac{N}{N_1N_2}k_1 + \dfrac{N}{N_2}k_2 = k_1 + N_1k_2 \end{cases}$$

In these equations are conditioned on: $n_1, k_2=0 \ldots N_1-1$; $n_2, k_1=0 \ldots N_2-1$. The above equation (1) can be expressed with equations (2) and (3) as follows:

[Formula 3]

$$\hat{X}(k_1, k_2) = \sum_{n2=0}^{N_2-1} \sum_{n1=0}^{N_1-1} x(n)\exp\left\{-j\frac{2\pi}{N}(N_2n_1 + n_2)(k_1 + N_1k_2)\right\} \qquad (2)$$

$$= \sum_{n2=0}^{N_2-1}\left[\left\{\sum_{n1=0}^{N_1-1} x(N_2n_1 + n_2)\exp\left(-j\frac{2\pi n_1 k_1}{N_1}\right)\right\}\exp\left(-j\frac{2\pi n_2 k_1}{N}\right)\right]\exp\left(-j\frac{2\pi n_2 k_2}{N_2}\right) \quad (3)$$

Further, the following equations (4) and (5) yield an equation (6):

[Formula 4]

$$\hat{x}_{k1}(n_2) = \sum_{n_1=0}^{N_1-1} x(N_2n_1 + n_2)\exp\left(-j\frac{2\pi n_1 k_1}{N_1}\right) \quad (4)$$

$$\hat{\hat{x}}_{k1}(n_2) = \hat{x}k_1(n_2)\exp\left(-j\frac{2\pi n_2 k_1}{N}\right) \quad (5)$$

[Formula 5]

$$\hat{X}_{k1}(k_2) = \sum_{n_2=0}^{N_2-1} \hat{\hat{x}}_{k1}(n_2)\exp\left(-j\frac{2\pi n_2 k_2}{N_2}\right) \quad (6)$$

Assuming that $k_1$ is a constant, the equation (6) is the DFT with $N_2$ points. Namely, performing the equations (4) and (5) can split the N-point DFT into $N_2$-point DFTs for the number of $N_1$. If $N_2$ can be further factorized, repeating the above method can split a DFT with the much smaller number of points. The FFT uses the split method to effectively perform DFT operations.

The following equation (7) defines an inverse transform, allowing a split computation in the same manner as the forward transform:

[Formula 6]

$$x(n) = \sum_{k=0}^{N-1} X(k)\exp\left(j\frac{2\pi nk}{N}\right) \quad k = 0, \ldots, N-1 \quad (7)$$

The following describes an embodiment of the present invention, namely an FFT apparatus with the number of points $M \times 2^n$. First, the forward transform is described.

It is possible to use the existing FFT with the number of points $N=2^n$ for implementing the FFT with the number of points $N=M \times 2^n$, where M is an odd number, by applying M to $N_1$ and N/M ($=2^n$) to N2. The flowchart in FIG. 1 explains this processing. FIG. 1 and the following description assume an array to be a complex number. The real part and the imaginary part are substituted during substitution between array elements. For example, the representation x'(i)=x(i) denotes that the real part and the imaginary part of x(i) are assigned to those of x'(i), respectively. Input data comprising N samples are placed in an array x like x(0), x(1), . . . , x(N-1).

The following describes the FFT method with the number of points $M \times 2^n$ with reference to FIG. 1. At step S1, i=0 is set. At step S2, M data samples are fetched into x'(j), where $0 \leq j < M$. At step S3, the above operation (4), namely an M-point DFT, is applied to the data fetched at step S2. Namely, the following equation (8) is performed:

[Formula 7]

$$y(k) = \sum_{n=0}^{M-1} x'(n)\exp\left(-j\frac{2\pi nk}{M}\right) \quad (8)$$

The equation (8) can be computed fast by following a procedure as described later. At step S4, the resulting y(k) is multiplied by a twist coefficient w(i, k) as shown in equation (5). Then, the result is placed in y(k). The twist coefficient w(i, k) is a value defined by the following equation (9):

[Formula 8]

$$w(i, k) = \exp\left(-j\frac{2\pi ik}{N}\right) \quad (9)$$

The twist coefficient w(i, k) becomes 1 when k=0. This operation can be performed within the range of $1 \leq k \leq M-1$.

At step S5, the y(k) value is overwritten to the array x which contains the original data. It may be preferable to place this value in another array without overwriting.

Figure 2:
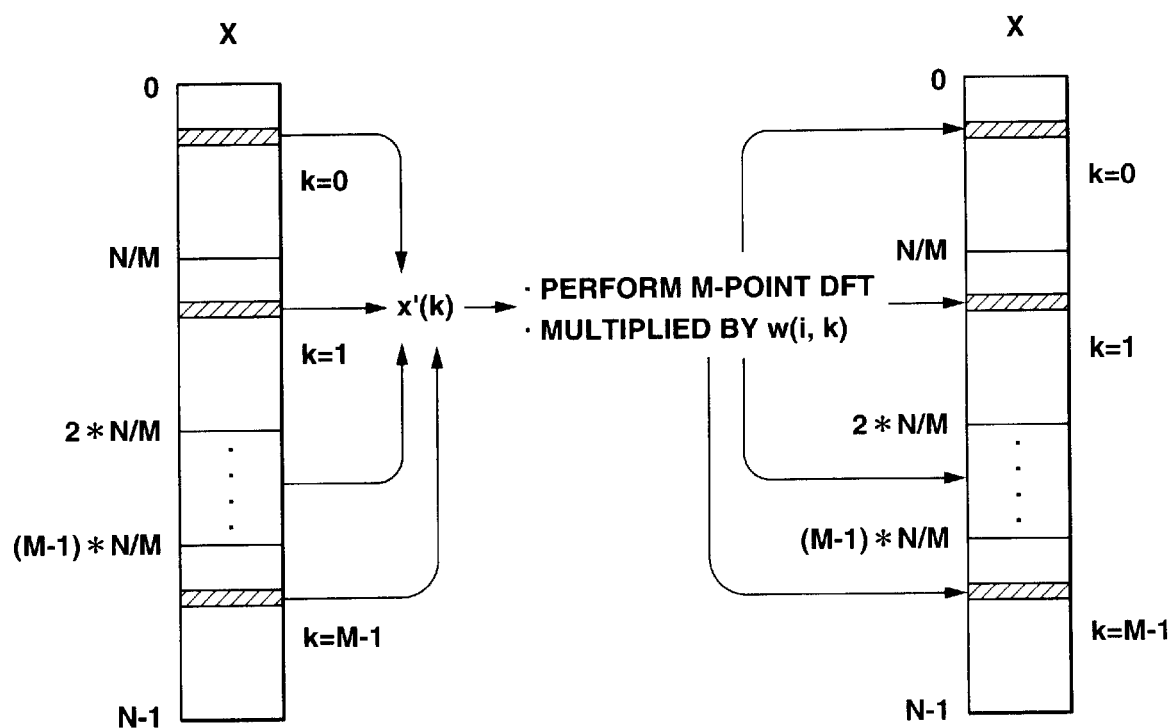
FIG. 2 schematically shows operations described by the flowchart in FIG. 1.

FIG. 2 schematically shows the operation from steps S1 to S5 in FIG. 1. M data samples are fetched from the array x for every N/M. The DFT is multiplied by the twist coefficient. The result is returned to the array. This operation is repeated N/M times through steps S6 and S7 until all the input data is processed.

Figure 3:
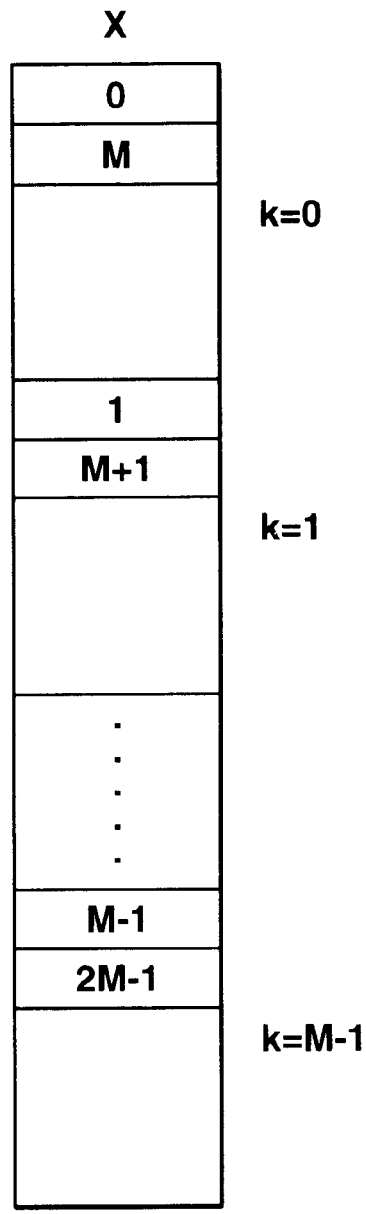
FIG. 3 shows positional relationship between array data and a corresponding index.

Then, the equation (6) above is performed according to the normal FFT. After step S8, the FFT with N/M ($=2^n$) points is performed within the range of $0 \leq k \leq M$ at step S9. The FFT-performed result is returned to the original array to place an intended value in the array x. However, there is provided relationship between a location where data exists and an actual array index as shown in FIG. 3. After steps S10 and S11 in FIG. 1, a sort is performed at step S12 as follows:

[Formula 9]

$$X(iM+k)=x(i+kN/M) \quad (0 \leq i < N/M, \ 0 \leq k < M)$$

This array X(k) ($0 \leq k < N$) will contain a digital Fourier coefficient for x(i).

The following describes an inverse transform. In FIG. 1, the inverse transform is assumed to be IDFT in the following equation using 2 DFTs:

[Formula 10]

$$IDFT(y(k)) = \sum_{n=0}^{M-1} x'(k)\exp\left(j\frac{2\pi nk}{M}\right)$$

At step S4 in FIG. 1, w(i, k) is defined as in the following equation:

[Formula 11]

$$w(i, k) = \exp\left(j\frac{2\pi ik}{N}\right)$$

The inverse transform can be computed in the same procedure as for the forward transform by replacing FFT at step S9 in FIG. 1 with IFFT.

The following describes a fast M-point DFT:

[Formula 12]

$$y(k) = \sum_{n=0}^{M-1} x(n)\exp\left(-j\frac{2\pi nk}{M}\right)$$

An M-point DFT (M is an odd number) indicated in the above-mentioned equation can be fast computed by using the trigonometric function's symmetry. When a complex number x(n) ($0 \leq n \leq M-1$) is defined as in the following equation, y(k) is expressed as the equation (10) below:

[Formula 13]

$$x(n) = x_r(n) + jx_i(n)$$

[Formula 13]

$$y(k) = \sum_{n=0}^{M-1} x(n)\exp\left(-j\frac{2\pi nk}{M}\right)$$

$$= \sum_{n=0}^{M-1} \{x_r(n) + jx_i(n)\}\left\{\cos\left(\frac{2\pi nk}{M}\right) - j\sin\left(\frac{2\pi nk}{M}\right)\right\}$$

$$= \sum_{n=0}^{M-1} x_r(n)\cos\left(\frac{2\pi nk}{M}\right) + \sum_{n=0}^{M-1} x_i(n)\sin\left(\frac{2\pi nk}{M}\right) + j\left\{\sum_{n=0}^{M-1} x_i(n)\cos\left(\frac{2\pi nk}{M}\right) - \sum_{n=0}^{M-1} x_r(n)\sin\left(\frac{2\pi nk}{M}\right)\right\}$$

(10)

Here, the terms in the equation (10) are replaced by the following equations (11) through (14):

[Formula 15]

$$Y_1(k) = \sum_{n=0}^{M-1} x_r(n)\cos\left(\frac{2\pi nk}{M}\right) \quad (11)$$

[Formula 16]

$$Y_2(k) = \sum_{n=0}^{M-1} x_i(n)\sin\left(\frac{2\pi nk}{M}\right) \quad (12)$$

[Formula 17]

$$Y_3(k) = \sum_{n=0}^{M-1} x_i(n)\cos\left(\frac{2\pi nk}{M}\right) \quad (13)$$

[Formula 18]

$$Y_4(k) = \sum_{n=0}^{M-1} x_r(n)\sin\left(\frac{2\pi nk}{M}\right) \quad (14)$$

The above-mentioned equation (10) can be written as the equation (15) as follows:

[Formula 19]

$$y(k) = Y_1(k) + Y_2(k) + j(Y_3(k) - Y_4(k)) \quad (15)$$

Under the condition of $1 \leq n \leq M-1$, the following equation is formulated:

[Formula 20]

$$\cos\left(\frac{2\pi(M-n)k}{M}\right) = \cos\left(2\pi k - \frac{2\pi nk}{M}\right)$$

$$= \cos\left(\frac{2\pi nk}{M}\right)$$

-continued $$\sin\left(\frac{2\pi(M-n)k}{M}\right) = \sin\left(2\pi k - \frac{2\pi nk}{M}\right)$$

$$= -\sin\left(\frac{2\pi nk}{M}\right)$$

Accordingly, the above-mentioned equations (11) through (14) can be computed as the following equations (16) through (19), decreasing an operational amount:

[Formula 21]

$$Y_1(k) = x_r(0) + \sum_{n=1}^{(M-1)/2} \{x_r(n) + x_r(M-n)\}\cos\left(\frac{2\pi nk}{M}\right) \quad (16)$$

[Formula 22]

$$Y_2(k) = \sum_{n=1}^{(M-1)/2} \{x_i(n) + x_i(M-n)\}\sin\left(\frac{2\pi nk}{M}\right) \quad (17)$$

[Formula 23]

$$Y_3(k) = x_i(0) + \sum_{n=1}^{(M-1)/2} \{x_i(n) + x_i(M-n)\}\cos\left(\frac{2\pi nk}{M}\right) \quad (18)$$

[Formula 24]

$$Y_4(k) = \sum_{n=1}^{(M-1)/2} \{x_r(n) + x_r(M-n)\}\sin\left(\frac{2\pi nk}{M}\right) \quad (19)$$

With respect to k in $1 \leq k \leq (M-1)/2$, the following equation (20) is formulated:

[Formula 25]

$$\begin{aligned}(M-k) &= \sum_{n=0}^{M-1} x(n)\exp\left(-j\frac{2\pi n(M-k)}{M}\right) \\ &= \sum_{n=0}^{M-1} x(n)\exp\left(j\frac{2\pi nk}{M}\right) \\ &= \sum_{n=0}^{M-1} x_r(n)\cos\left(\frac{2\pi nk}{M}\right) - \sum_{n=0}^{M-1} x_i(n)\sin\left(\frac{2\pi nk}{M}\right) + j\left\{\sum_{n=0}^{M-1} x_i(n)\cos\left(\frac{2\pi nk}{M}\right) + \sum_{n=0}^{M-1} x_r(n)\sin\left(\frac{2\pi nk}{M}\right)\right\} \\ &= Y_1(k) - Y_2(k) + j\{Y_3(k) + Y_4(k)\}\end{aligned} \quad (20)$$

As is apparent from a comparison between the equations (15) and (20), y(k) is found by partially computing $Y_1(k)$, $Y_2(k)$, $Y_3(k)$, and $Y_4(k)$. It is possible to find y(M−k) just from add/sub operations using that partial computation. When k=0, the following equation is formulated:

[Formula 26]

$$y(0) = \sum_{n=0}^{M-1} x(n)\exp(0) = \sum_{n=0}^{M-1} x(n)$$

This equation makes it apparent that just the summation can implement computation.

Figure 4:
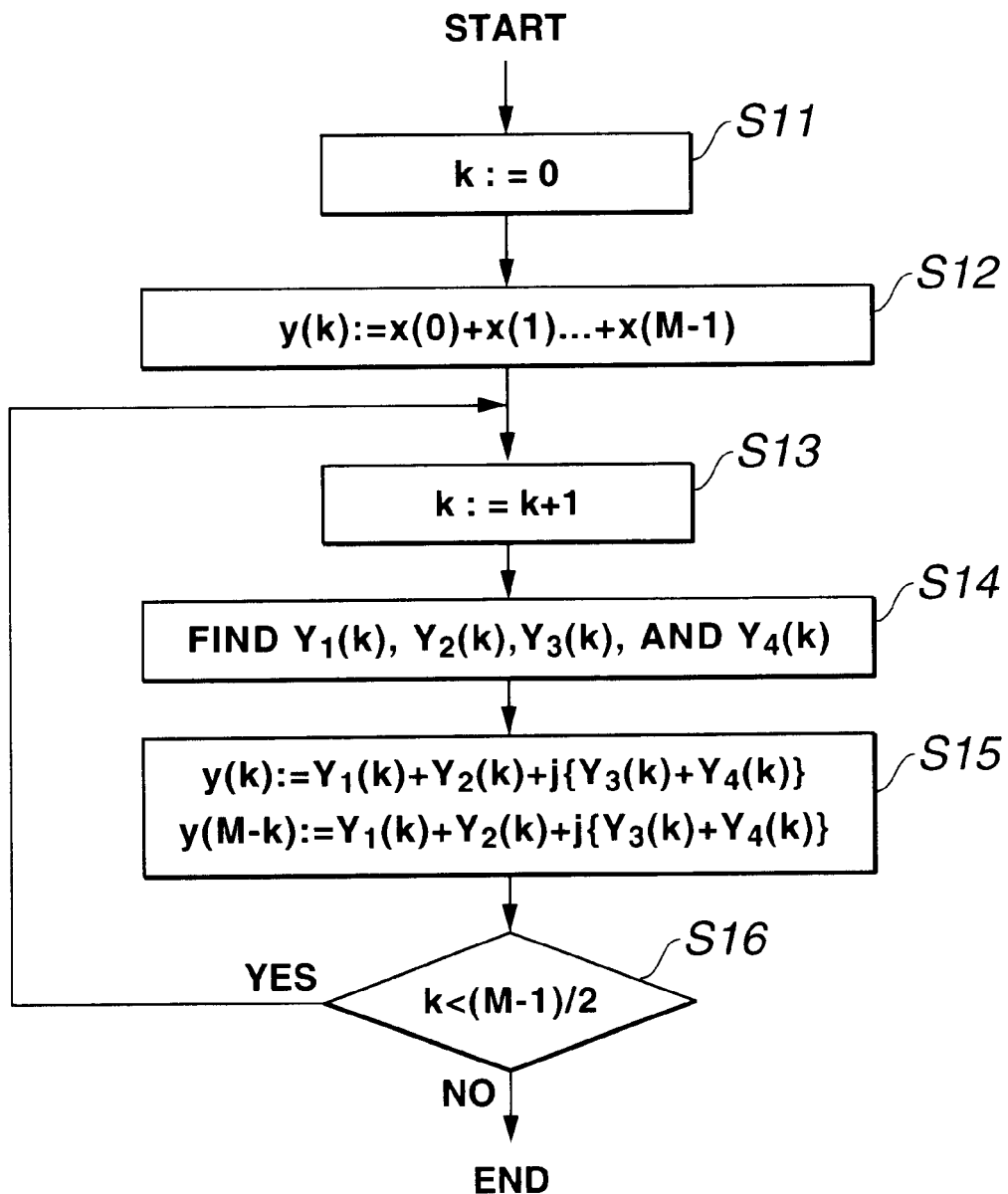
FIG. 4 is a flowchart for fast DFT computation.

According to the above description, it is understood that the flowchart in FIG. 4 summarizes fast computation for the M-point DFT.

First, y(0)=x(0)+x(1) . . . x(M−1) is computed. Then the following operations (a) and (b) are repeated for k in $1 \leq k \leq (M-1)/2$. The operation (a) finds $Y_1(k)$, $Y_2(k)$, $Y_3(k)$, and $Y_4(k)$ according to the equations (16) through (19). The operation (b) uses a value found in (a) and further finds y(k) and y(M−k) according to the equations (15) and (20).

Similarly, the above-mentioned fast computation can be applied to an IFFT as shown in the following equation:

[Formula 27]

$$\bar{x}(k) = \sum_{n=0}^{M-1} y(n)\exp\left(j\frac{2\pi nk}{M}\right)$$

There is formulated $y(n)=Y_r(n)+jy_i(n)$. Under the condition of $1 \leq k \leq (M-1)/2$, the following equations (21) through (26) are defined:

[Formula 28]

$$X_1(k) = y_r(0) + \sum_{n=1}^{(M-1)/2} \{y_r(n) + y_r(M-n)\}\cos\left(\frac{2\pi nk}{M}\right) \quad (21)$$

[Formula 29]

$$X_2(k) = \sum_{n=1}^{(M-1)/2} \{y_i(n) + y_i(M-n)\}\sin\left(\frac{2\pi nk}{M}\right) \quad (22)$$

[Formula 30]

$$X_3(k) = y_i(0) + \sum_{n=1}^{(M-1)/2} \{y_i(n) + y_i(M-n)\}\cos\left(\frac{2\pi nk}{M}\right) \quad (23)$$

[Formula 31]

$$X_4(k) = \sum_{n=1}^{(M-1)/2} \{y_r(n) + y_r(M-n)\}\sin\left(\frac{2\pi nk}{M}\right) \quad (24)$$

[Formula 32]

$$\bar{x}(k) = X_1(k) - X_2(k) + j\{X_3(k) + X_4(k)\} \quad (25)$$

[Formula 33]

$$\bar{x}(M-k) = X_1(k) + X_2(k) + j\{X_3(k) - X_4(k)\} \quad (26)$$

First, x∼(0)=y(0)+y(1) . . . y(M−1) is computed. With respect to k in $1 \leq k \leq (M-1)/2$, $X_1(k)$ through $X_4(k)$ are found according to the equations (21) through (24). Then, the equations (15) and (20) are used to find x∼(k) and x∼(M−k).

The IFFT can be computed according to the above-mentioned operations.

The following describes an operation amount. Generally, a computer architecture affects operation costs of addition, subtraction, and multiplication of real numbers. To simplify estimation of an operation amount, however, all the operation costs are assumed to be 1. An operation cost for adding or subtracting complex numbers is assumed to be two operations for adding or subtracting real numbers (2 in total). An operation cost for multiplying complex numbers is assumed to be four operations for multiplying real numbers and two operations for adding or subtracting real numbers (6 in total).

Based on this principle of operation costs, the following describes an operation amount for the above-mentioned fast M-point DFT. FIG. 4 is used for finding an operation amount $C_{DFT}(M)$ for the fast M-point DFT.

At step S11, k=0 is set. At step S12, add/sub operations for complex numbers are performed (M−1) times. At step S13, k+1 is performed. At step S14, add/sub operations are performed ((M−1)/2×(4M−6)) times and multiply operations are performed ((M−1)/2×(2M−1)) times for real numbers. At step S16, add/sub operations are performed for real numbers ((M−1)/2×4) times. The above processing is repeated until the condition of k<(M−1)/2 at step S16 is satisfied.

Accordingly, the following equation is used to find an operation amount $C_{DFT}(M)$ for the fast M-point DFT:

[Formula 34]

$$C_{DFT}(M) = (M-1) \times 2 + (M-2)/2 \times (4M-6) + (M-1)/2 \times (2M-1) + (M-1)/2 \times 4$$
$$= 6M(M-1)$$

The following describes an operation amount for the M×2$^n$-point FFT. There is no difference between FFT and IFFT with respect to an operation amount. The description below only covers an operation amount for FFT.

First, an operation amount $C_{FFT}(N)$ is found when an N=2$^n$-point FFT is performed with base 2. For obtaining the product with a twist coefficient, the N=2$^n$-point FFT performs multiply operations N/2·log$_2$(N) times for complex numbers, a butterfly operation, and add operations N·log$_2$(N) times for complex numbers. The following equation is used for finding $C_{FFT}(N)$:

[Formula 35]

$$C_{FFT}(N) = 6 \times \frac{N}{2} \log_2 N + 2 \times N \log_2(N)$$
$$= 5N \log_2(N)$$

When an N=M×2$^n$-point FFT is performed according to the method of the present invention, the following describes how to find an operation amount $C'_{FFT}(N)$ with reference to FIG. 1.

At step S3 in FIG. 1, an operation amount for N/M×$C_{DFT}$(M) is found because the DFT is performed N/M times. At step S4, an operation amount for 6×N/M×(M−1) is found because a multiply operation for complex numbers is performed (N/M×(M−1)) times. At step S9, an operation amount for M×$C_{FFT}$(N/M) is found because an N/M-point FFT is performed M times. Consequently, the following equation is obtained:

[Formula 36]

$$C'_{DFT}(N) = N/M \times C_{DFT}(M) + 6 \times N/M \times (M-1) + M \times C_{FFT}(N/M)$$
$$= N/M \times 6M(M-1) + 6 \times N/M \times (M-1) + M \times 5(N/M)\log_2(N/M)$$
$$= 6N(M^2-1)/M + 5N\log_2(N/M)\}$$

Accordingly, when M is sufficiently smaller than N, it is understood that an operation amount for the FFT according to the present invention also can be almost at the level of Nlog$_2$(N).

When operation amounts are compared between the FFT according to the present invention and the DFT, the result is $C_{DFT}(2560)/C'_{FFT}(2560)=208$ given that N=5×2$^9$(=2560), for example. The FFT can be computed approximately 200 times faster than the DFT.

For comparing operation amounts between the FFT according to the present invention and the conventional base-2 FFT, an increase rate for operation amounts can be defined as in the following equation:

[Formula 37]

$$R_{FFT}(N, M) = 100 \times \frac{C'_{FFT}(N) - C_{FFT}(N)}{C_{FFT}(N)} (\%)$$

Actually, it is impossible to apply the function $C_{FFT}(N)$ with the base-2 FFT operation amount to the value N which is not raised to the second power. However, this method is used for effective comparison. The following table lists $R_{FFT}(N, M)$ values according to combinations of N and M.

TABLE 1

|  | M = 3 | M = 5 | M = 7 | M = 9 |
| --- | --- | --- | --- | --- |
| N = M × 64 | 21.3% | 41.3% | 61.6% | 81.8% |
| N = M × 512 | 15.2% | 30.4% | 45.9% | 61.6% |
| N = M × 4096 | 11.9% | 24.0% | 36.6% | 49.4% |

This table shows that an increase can be several tens of percentages if the value M is not excessively large.

What is claimed is:

1. A fast Fourier transform method for transforming input complex number data of M×2^n points in which M is an odd number other than 1 and n is an integer, where said input complex number data represents a function signal in the time domain, the method comprising the steps of:
   applying a fast Fourier transform to the input data, and
   outputting the transformed complex number data of M×2^n points resulting from said application of the fast Fourier transform, where the output transformed complex number data represents a function signal in the frequency domain.

2. A fast Fourier transform method for transforming input complex number data of M×2^n points in which M is an odd number other than 1 and n is an integer, where said input complex number data represents a function signal in the time domain, the method comprising the steps of:
   applying specified preprocessing to said complex data,
   performing a 2^n-point fast Fourier transform to said preprocessed complex data which is split into M portions, and outputting a result of M×2^n-point discrete Fourier transform where the output result represents a function signal in the frequency domain.

3. The fast Fourier transform method according to claim 2, wherein said specified preprocessing comprises the steps of:

splitting said input data into split data, performing an M-point discrete Fourier transform to the split data, and multiplying a resulting N-point discrete Fourier transform coefficient by a specified coefficient.

4. The fast Fourier transform method according to claim 3, wherein said specified preprocessing uses trigonometric function's symmetry to decrease an operation amount in calculation of discrete Fourier transform coefficient by applying n M-point discrete Fourier transform to said split data.

5. The fast Fourier transform method according to claim 2, wherein said specified preprocessing comprises the steps of:

fetching M-point data in units of 2^n from said input data, applying a discrete Fourier transform to the M-point data, multiplying an obtained M-point discrete Fourier transform coefficient by a twist coefficient, and outputting a multiplication result as the preprocessed data.

6. An inverse fast Fourier transform method for transforming input complex number data of M×2^n points in which M is an odd number other than 1 and n is an integer, where said input complex number data represents a function signal in the frequency domain, the method comprising the steps of:

applying an inverse fast Fourier transform to the input data, and outputting the transformed complex number data of M×2^n points resulting from said application of the fast Fourier transform, where the output transformed complex number data represents a function signal in the time domain.

7. An inverse fast Fourier transform method for transforming input complex number data of M×2^n points in which M is an odd number other than 1 and n is an integer, where said input complex number data represents a function signal in the frequency domain, the method comprising the steps of:

applying specified preprocessing to said input data, applying a 2^n-point inverse fast Fourier transform to said preprocessed complex data which is split into M portions, and outputting a result of an M×2^n-point inverse discrete Fourier transform where the output result represents a function signal in the time domain.

8. The inverse fast Fourier transform method according to claim 7, wherein said specified preprocessing comprises the steps of:

splitting said input data into split data, performing an M-point inverse discrete Fourier transform to the split data, and multiplying a resulting M-point inverse discrete Fourier transform coefficient by a specified coefficient.

9. The inverse fast Fourier transform method according to claim 8, wherein said specified preprocessing uses trigonometric function's symmetry to decrease an operation amount in calculation of inverse discrete Fourier transform coefficient by applying an M-point inverse discrete Fourier transform to said split data.

10. The inverse fast Fourier transform method according to claim 7, wherein said specified preprocessing comprises the steps of:

fetching N-point data in units of N/M from said input data, applying an inverse discrete Fourier transform to the M-point data, multiplying an obtained M-point inverse discrete Fourier transform coefficient by a twist coefficient, and outputting a multiplication result as the preprocessed data.

* * * * *